(12) United States Patent
Ma et al.

(10) Patent No.: US 6,269,010 B1
(45) Date of Patent: Jul. 31, 2001

(54) CSI BASED DRIVE HAVING FEEDFORWARD CONTROL OF INVERTER INPUT VOLTAGE

(75) Inventors: Daming Ma; Bin Wu, both of Toronto; Navid R. Zargari; Steven C. Rizzo, both of Cambridge, all of (CA)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/516,974

(22) Filed: Feb. 29, 2000

(51) Int. Cl.$^7$ .................................................. H02J 3/36
(52) U.S. Cl. .............................................. 363/35; 363/138
(58) Field of Search ................................. 363/34, 35, 37, 363/89, 127, 97, 131, 135, 137, 138, 98

(56) References Cited

U.S. PATENT DOCUMENTS 4,894,762 * 1/1990 Steinshorn ............................. 363/35
5,373,223 * 12/1994 Akagi et al. .......................... 363/34

OTHER PUBLICATIONS

Itoh, "Stability of induction motor drive controlled by current-source inverter", IEE Proceedings, vol. 136, Pt. B, No. 2, pp. 83–88, Mar. 1989.

* cited by examiner

*Primary Examiner*—Peter S. Wong
*Assistant Examiner*—Gary L. Laxton
(74) *Attorney, Agent, or Firm*—Himanshu S. Amin; A. M. Gerasimow; William R. Walbrun

(57) ABSTRACT

The drive for an a.c. induction motor features a rectifier for converting alternating current into direct current and a current source inverter for converting direct current into alternating current supplied to a motor. A d.c. link choke interconnects the rectifier and the inverter. The inverter includes a first control loop which provides a desired or command d.c. link choke current to a second control loop responsible for the rectifier. For the purposes of the second control loop the actual d.c. link choke current and an input voltage of the inverter are detected. The difference or error between the desired and actual d.c. choke currents are minimized by a compensator. The output of the compensator is added to the detected inverter input voltage, and the sum is fed to a switching pattern generator which controls the switches in the rectifier. In this manner the feedback of the inverter input voltage is decoupled from the compensator responsible for the d.c. link choke current. This makes the parameters of the second control loop substantially independent of the load, thereby enhancing the ease with which the control loop may be tuned and hence the stability of the drive.

10 Claims, 6 Drawing Sheets

CSI BASED DRIVE HAVING FEEDFORWARD CONTROL OF INVERTER INPUT VOLTAGE

FIELD OF INVENTION

The invention generally relates to the field of power electronics. Conjointly, the invention also relates to a drive for an alternating current (a.c.) induction motor which employs a current source inverter and features improved voltage regulation and suppressed resonance between the drive and motor. The improved drive is suitable for high power multi-motor applications.

BACKGROUND OF INVENTION

Pulse width modulated current source inverter (CSI) based a.c. motor drives are increasingly used in high power (e.g., 1,000~10,000 hp) applications. See, for instance, P. M. Espelage and J. M. Nowak, "Symmetrical GTO Current Source Inverter for Wide Speed Range Control of 2300 to 4160 volt, 350 to 7000 hp, Induction Motors", IEEE IAS Annual Meeting, pp 302~307, 1988. Compared with voltage source inverter fed drives, the CSI drive features simple structure, reliable short circuit protection, four quadrant operation capability and nearly sinusoidal output voltage and current waveforms. In addition, the symmetrical gate turn-off thyristor (GTO) switching devices typically used in CSI drives can be easily connected in series, which makes the CSI drive particularly suitable for implementation at medium/high voltage levels such as 4160 Volts and up. Further details concerning the benefits of the CSI drive can be found in F. DeWinter and B. Wu, "Medium Voltage Motor Harmonic Heating, Torques and Voltage Stress When Applied on VFDs", IEEE 43rd PCIC Conference, pp 131–139, 1996.

In many industrial applications, it is often necessary to control multiple motors in some manner. In these cases, it will be more economical to drive all motors by a single drive system rather than implementing individual drive/motor systems. To date, however, the CSI drive has typically been applied to singlerive/single-motor applications.

The CSI drive is not problem-free. In the CSI drive with a single a.c. induction motor, there exists a resonance mode due to the parallel connection of the output filter capacitor and the motor. This makes it difficult to stabilize the system if the drive operates at a frequency which is close to the resonant frequency. Further details concerning this problem can be found in the following two references, both of which are incorporated herein in their entirety: B. Wu, F. DeWinter, "Elimination of Harmonic Resonance in High Power GTO-CSI Induction Motor Drives", IEEE PESC Conf. pp 1011–1015, 1994; and R. Itoh, "Stability of Induction Motor Drive Controlled by Current-source Inverter", IEE Proc. Vol. 136, Pt. B, No. 2, pp 83–88, 1989. The situation becomes even worse when the motor is unloaded since the inverter output current in this case is minimal whereas the resonant current flowing between the capacitor and the motor magnetizing inductance is substantial.

A similar resonance problem also exists when a PWM rectifier is employed in the drive to provide direct current to the CSI from a power source. In this case, a resonance mode exists between an input a.c. filter capacitor of the rectifier and the system impedance of the line voltage source. If the resonance frequency is close to a characteristic harmonic of the rectifier an oscillation will occur, which makes the stability of the PWM rectifier sensitive to the system impedance. Unfortunately it is difficult to measure the system impedance accurately, which complicates the design of a compensating filter. In addition, even when the resonance frequency is not close to any characteristic harmonic of the rectifier, undesired oscillations will also occur during transient states. See additionally, N. R. Zargari, G. Joos, and P. D. Ziogas, "Input Filter Design for PWM Current-Source Rectifiers", IEEE Trans. on Ind. Appl., vol. 30, No. 6, pp 1573–1579, 1994.

In a CSI drive with multiple motors, there are two major technical challenges which must be overcome to make such a drive practical. First, the motors connected to the inverter may have different sizes, which may produce multiple resonant modes. The effect of these and other resonant modes on drive stability should be minimized, and the drive should be able to operate steadily over a fill speed range. Second, the inverter output voltage should be kept constant both in steady and transient states for a given output frequency. In other words, the inverter output voltage should be stiff, not affected by changes in multiple motor loads. Otherwise an interaction between the motors and inverter will occur when one or more motors are loaded or unloaded, making the system unstable. The invention seeks to overcome various of these problems.

SUMMARY OF INVENTION

The general utility of the invention(s) described herein relate to improved CSI-based motor drives. However, those skilled in the art will understand that the various aspects of the invention may be employed more generally in the field of power electronics.

One aspect of the invention reduces the resonance existing between one or more output filter capacitors of a current source inverter and an a.c. induction motor. This is achieved through the use of active damping control, wherein the invention essentially simulates the use of a physical damping resistor connected in parallel with each output capacitor. This is accomplished by determining how much current would flow through the resistor had it been there, and this current, which is equal to the voltage across the output filter capacitor divided by the value of the resistor, is deducted from a command or reference current used to control the inverter. From a control point of view, the invention provides damping similar to the use of a real damping resistor, but without the corresponding energy loss.

Under this aspect of the invention, an inverter is provided which includes a switching bridge for converting direct current into alternating current. The direct current is coupled to a line side of the switching bridge and the alternating current is provided at a load side of the switching bridge. A switching pattern generator controls switches in the switching bridge based on a reference current. At least one capacitor is connected at a terminal thereof to the load side of the switching bridge. The terminal is connectable to a load having an inductance, such as an a.c. induction motor. Control circuitry connected to the switching pattern generator (i) measures the load current or voltage and generates a nominal reference current based on an error therein;
(ii) determines a damping current based on the voltage at the terminal; and
(iii) determines the reference current supplied to the switching pattern generator by subtracting the damping current from the nominal reference current.

The active damping control may also be applied to a pulse width modulated (PWM) rectifier to reduce resonance caused between one or more input a.c. shunt capacitors of the PWM rectifier and the system impedance of a power source. In this variant of the invention, a PWM rectifier is provided which includes a switching bridge for converting alternating current into direct current. The alternating current is coupled to a line side of the switching bridge and the direct current is provided at a load side of the switching bridge. A switching pattern generator controls switches in the switching bridge based on a reference current. At least one shunt capacitor is connected at a terminal thereof to the line side of the switching bridge. An alternating current power source having a system inductance may be connected to the terminal. Control circuitry connected to the switching pattern generator:

(i) measures a load current or voltage and generates a nominal reference current based on an error therein;

(ii) determines a damping current based on the voltage at the terminal, and (iii) determines the reference current supplied to the switching pattern generator by subtracting the damping current from the nominal reference current.

According to another variant of the invention, a drive is provided which comprises a PWM rectifier coupled to a current source inverter via a d.c. link choke. The PWM rectifier and the current source inverter each employ active damping control.

According to a second aspect of the invention, the stability of a CSI-based drive may be enhanced by feedforward control of the d.c. voltage supplied to the inverter. According to this aspect of the invention a drive for an a.c. induction motor is provided which comprises a rectifier for converting alternating current into direct current and a current source inverter for converting direct current into alternating current supplied to a motor. A d.c. link choke interconnects the rectifier and the inverter. The inverter includes a first control loop which provides a desired or conunand d.c. link choke current to a second control loop responsible for the rectifier. For the purposes of the second control loop the actual d.c. link choke current and an input voltage of the inverter are detected. The difference or error between the desired and actual d.c. choke currents are minimized by a compensator. The output of the compensator is added to the detected inverter input voltage, and the sum is fed to a switching pattern generator which controls the switches in the rectifier. In this manner the feedback of the inverter input voltage is decoupled from the compensator responsible for the d.c. link choke current. This makes the parameters of the second control loop substantially independent of the load, thereby enhancing the ease with which the control loop may be tuned and hence the stability of the drive.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein the reference numerals bear unique, occasionally alphabetical suffixes in order to identify specific instantiations of like elements).

DETAILED DESCRIPTION OF ILLUSTRATIVE EMBODIMENTS

The detailed description is divided into two parts. The first portion of the discussion relates to active damping control in order to suppress resonance modes. The second part of the discussion centres on enhancement of the CSI-based drive through the use of feedforward control.

1. Active Damping Control

Figure 1:
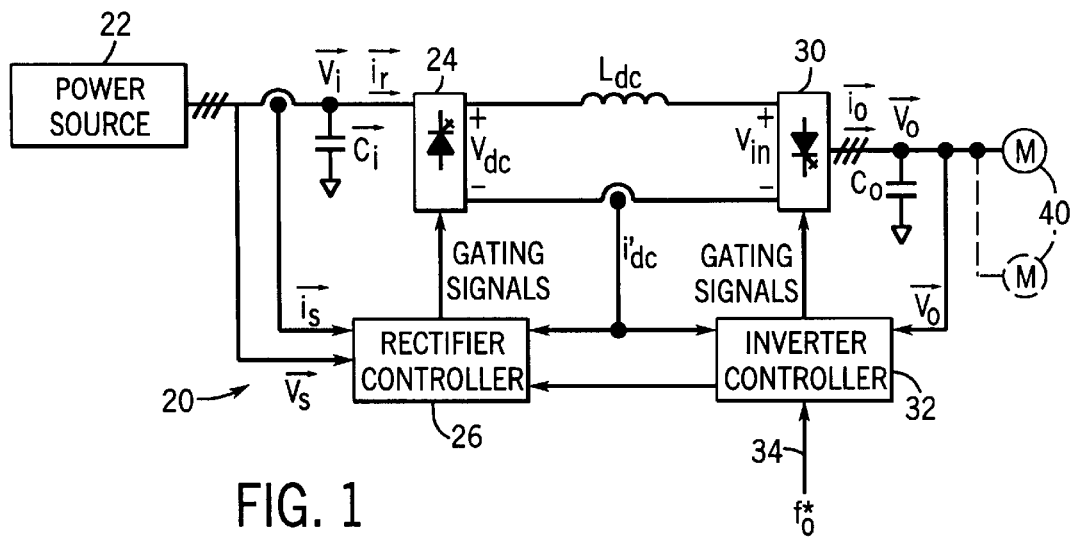
FIG. 1 is a system block diagram of a CSI-based motor drive.

Referring to the drawings, FIG. 1 shows a schematic block diagram of a drive 20 for control of one or more a.c. induction motors 40. The drive 20 comprises a rectifier 24 coupled to a current source inverter 30 via a d.c. link choke or inductor $L_{dc}$. The rectifier 24 converts alternating current supplied from a three-phase power source 22 into direct current which is smoothed by the d.c. link choke $L_{dc}$, thereby providing a current source for the inverter 30. The inverter 30, in turn, converts the d.c. current into a three-phase alternating current (which may vary in terms of its frequency as well as magnitude) for supply to the a.c. induction motor 40.

The current source inverter 30 includes a per phase output filter capacitor $C_o$. which is connected to the load side of the inverter for the purpose of smoothing the output voltage and limiting transient voltage spikes during inverter changes of state. Similarly, depending on the type of rectifier employed, a per phase input filter capacitor $C_i$ may be connected to the line side of the rectifier 24 for the purposes of smoothing the input wave forms. The input filter capacitor also limits the total harmonic distortion and improves the power factor of the line voltages and currents, as typically required by the utility company.

Figure 2:
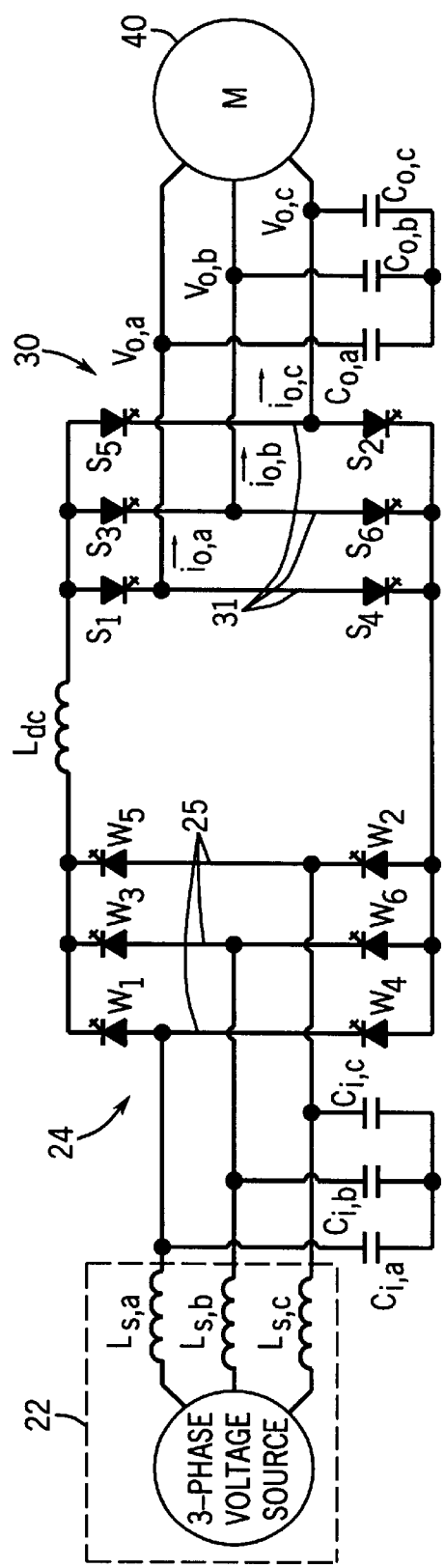
FIG. 2 is a circuit diagram of a rectifier and an inverter of the drive respectively connected to a power source and a motor.

FIG. 2 shows a circuit diagram of the rectifier 24 and inverter 30 as respectively connected to the power source 22 and motor 40. The rectifier 24 includes a three phase switching bridge comprising three legs 25 and six switches $W_1$–$W_6$ such as SCRs, GTOs, GCTs, IGCTs, SGCTs, or IGBTs as shown. The per phase input capacitors $C_{i,a}$, $C_{i,b}$ and $C_{i,c}$ are shown connected in delta formation, but may be alternatively connected in a wye formation. Similarly, the inverter 30 includes a three-phase switching bridge comprising three legs 31 and six GCT, IGCT, SGCT, IGBT or GTO switches $S_1$–$S_6$. The per phase output capacitors $C_{o,a}$ $C_{o,b}$ and $C_{o,c}$ are also shown connected in delta formation but may alternatively be connected in wye formation.

In the illustrated embodiment the drive 20 employs a constant hertz-velocity (CHV) or v/f control. This control technique attempts to keep the motor flux constant throughout the majority of the operating range of the motor, since the flux, $\psi$, is related to voltage and frequency as follows: $\psi$=kv/F, where k is a constant.

In the CSI inverter, the output voltage $\vec{v}_o$ is controlled by adjusting the inverter output current $\vec{i}_0$. To effect CHV control in a CSI drive, the drive 20 includes an inverter controller 32 which, is connected to a rectifier controller 26. Those skilled in the art will appreciate that while two distinct blocks 20 and 26 have been shown, the control loops provided by these blocks may be implemented in practice through the use of a single digital signal processor or other such microprocessor, as preferred. Those skilled in the art will also understand that analogue circuitry may be used in the alternative.

The external input or command to the drive is provided by a signal 34 which represents a desired motor operating frequency, $f_o*$ that generally or roughly corresponds to the desired rotational speed of the motor. Such a system can be used, inter alia, in compressor or fan applications where precise speed control is not critical. Alternatively, an outer motor speed feed back control loop may be employed (not shown) which outputs the value for signal 34 (although such a system is typically not used with CHV control).

Figure 3:
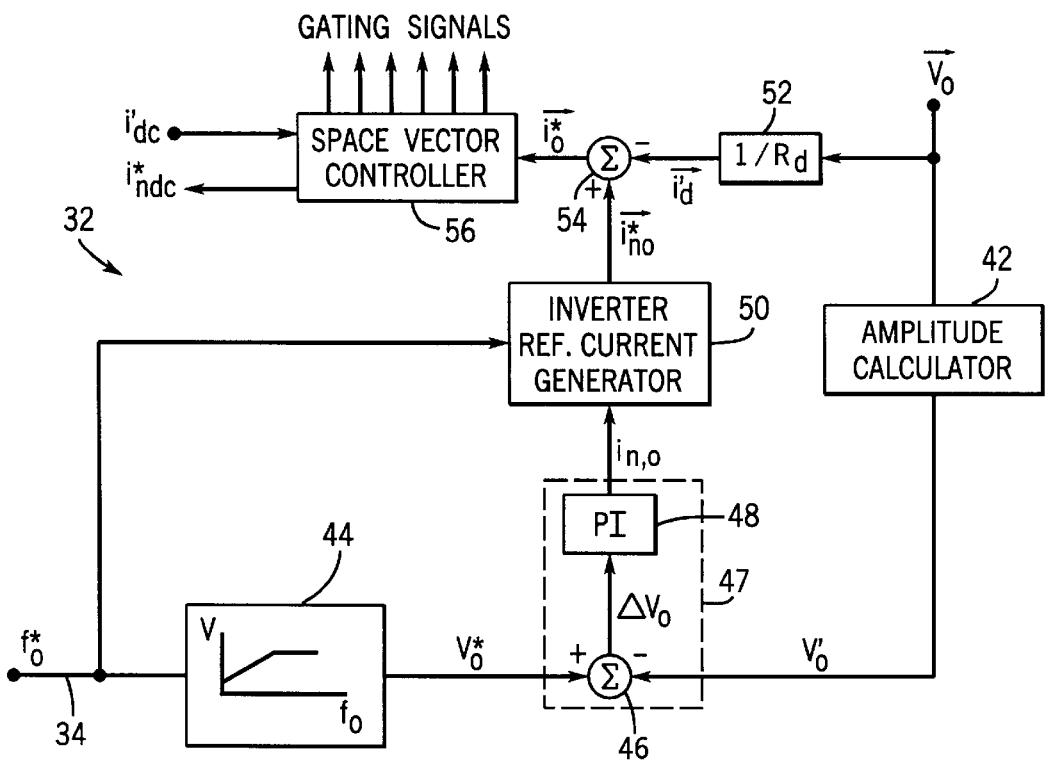
FIG. 3 is a system block diagram of an inverter controller.

FIG. 3 shows the inverter controller 32 in greater detail. The magnitude of the output voltage $\vec{v}_o$ is determined by an amplitude calculator 42 which generates a scalar output feedback voltage $v_o'$. The command operating frequency signal $f_o*$ is received by a CHV block 44 which computes a desired or command output voltage amplitude $v_o*$ equal to $k \cdot f_o*$, k being a pre-selected constant. (Note that the applied voltage is, however, typically limited to the rated voltage of the motor when $f_o*$ exceeds the rated operating frequency). The output voltage amplitude feedback $v_o'$ and the command voltage amplitude $v_o*$ are fed into a compensator 47 comprising a summer 46 and a p.i. or p.i.d. controller 48 whose output is a nominal desired output current amplitude $i_{no}$ set to minimize the error $v_o*-v_o'$ (i.e., $\Delta v_o$). An inverter reference current generator 50, as known in the art per se, receives the output of the p.i. compensator 47 and the command operating frequency signal $f_o*$ and generates a three-phase nominal reference current $\vec{i}_{no}$ having frequency $f_o*$, each phase being spaced apart by 120°. As discussed in greater detail below, a summer 54 deducts a three-phase damping current $\vec{i}_d$ from the nominal reference current $\vec{i}*_{no}$ to generate a three-phase reference current $\vec{i}*_o$. This quantity is fed into a switching pattern generator such as, but not limited to, a space vector controller 56 as known in the art per se which provides the gating signals to the power switches $S_1$–$S_6$ of the inverter 30.

Figure 4:
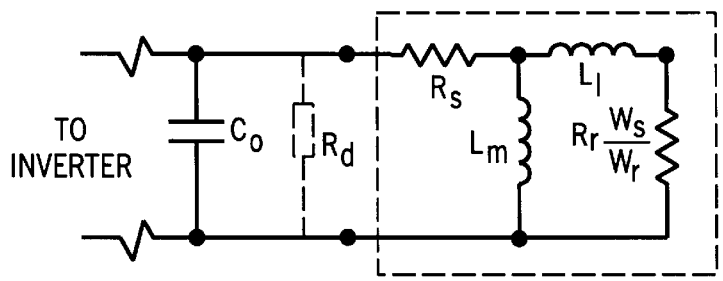
FIG. 4 is a circuit diagram of a per phase steady state equivalent circuit of the motor.

The damping current $\vec{i}_d$ provides active damping control of the resonance between each output filter capacitor $C_o$ and the motor inductances. To explain this in greater detail, additional reference is made to FIG. 4 wherein the per phase steady state equivalent circuit of the output capacitor $C_o$ and the motor 40 is shown. The motor includes a stator resistance $R_s$, a relatively large magnetizing inductance $L_m$, a relatively small leakage inductance $L_1$, and a rotor resistance $R_r 107_s/107_r$ whose impedance varies in relation to frequency and load conditions. From FIG. 4 it will be seen that there are two resonance modes caused by the output filter capacitor $C_o$ and the motor inductances. One is a comparatively high frequency resonance mode due to the output filter capacitor $C_o$ and the motor leakage inductance $L_1$. The other is a comparatively low frequency resonance associated with the output filter capacitor $C_o$ and the motor magnetizing inductance $L_m$. The high frequency resonance is usually excited by harmonic currents while the low frequency resonance may fall into the operating frequency range of the motor. If the drive operates at a frequency close to the resonance frequency, it becomes difficult to stabilize the system. For multi-induction motor drives, multiple resonance modes exist which complicate the problem even further.

Conceptually, the resonance modes may be suitably controlled by connecting a damping resistor $R_d$ (shown in phantom) in parallel with the output filter capacitor $C_o$. If the damping resistor $R_d$ is adequately small compared to the motor equivalent impedance, the parallel resonance can be sufficiently suppressed. This technique is not practical due to the high power loss caused by the damping resistor, especially in medium voltage applications. However, the damping effect can be simulated without the corresponding power loss, as follows.

Figure 6A:
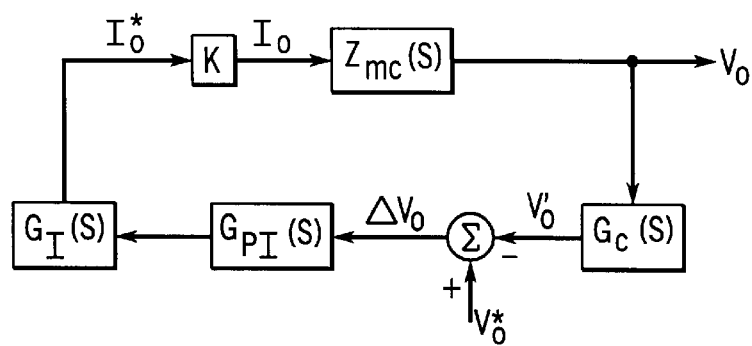
FIG. 6 is a system block diagram of the drive in the frequency domain when it is configured in (a) a conventional manner, (b) with a physical damping resistor, and (c) with an active damping control block.

Theoretically, the system block diagrams of FIGS. 1 and 3 can be simplified as shown in FIG. 6(a), where $Z_{mc}(s)$ represents the transfer function of output filter capacitor $C_o$ and induction motor, on a per phase basis. $G_c(s)$, $G_{Pi}(s)$ and $G_i(s)$ denote, respectively, the transfer functions of the amplitude calculator 42, the p.i. controller 48, and the inverter reference current generator 50. The current source inverter 30 and space vector controller 56 are considered as an ideal linear amplifier with a unity gain K. The damping control block 52 is not considered in FIG. 6(a).

Figure 6B:
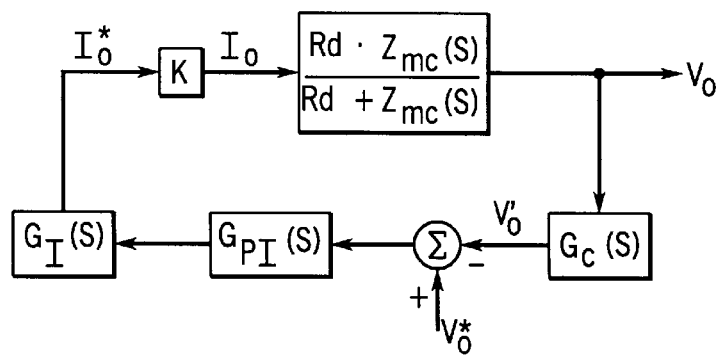

Assuming that a damping resistor $R_d$ is connected in parallel with the output filter capacitor $C_o$ and motor, the system block diagram in FIG. 6(a) will be modified as shown in FIG. 6(b).

Figure 6C:
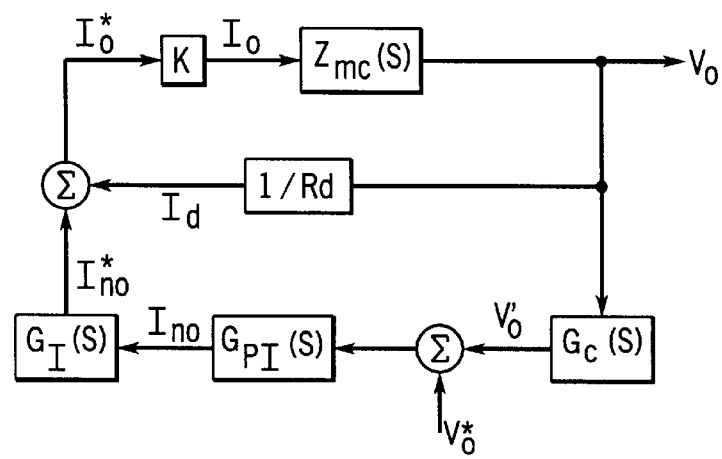

FIG. 6(c) shows a system block diagram which considers the damping factor block 52. The inverter output voltage $V_o(s)$ in FIG. 6(c) can be expressed as $$V_o(S) = (I*_{no}(s) - I_d(s)) \cdot K \cdot Z_{mc}(s) \qquad [1]$$

from which $$\frac{V_o(s)}{I*_{no}(s)} = K \cdot \frac{R_d \cdot Z_{mc}(s)}{R_d + Z_{mc}(s)} \qquad [2]$$

It will be seen that a similar transfer function is provided by the system block diagram of FIG. 6(b) where a damping resistor is physically used. Thus, it may be expected that the damping current $\vec{i}_d$, determined by $$\frac{\vec{v}_o}{R_d},$$

will likewise fulfil the same function as the physical damping resistor $R_d$ for resonance suppression.

The damping factor $R_d$ may be selected for particular applications by general adherence to the following steps:

First, for multi-motor drives, it is recommended to first calculate base values which depend on the total power rating of the multiple motors. Three base values are required, which are the base value of impedance $Z_b$, the base value of inductance $L_b$ and the base value of capacitor $C_b$. Base value calculations are well known in the art; see, for example, W. D. Stevenson, Jr., "Elements of Power System Analysis", 4$^{th}$ Ed., Mcgraw Hill, N.Y., N.Y., pp. 30–34.

Second, the per unit values of the leakage inductance $L_1$ and the magnetizing inductance $L_m$ for each motor can then be calculated based on the upper calculated base values. Then the multiple motors may be combined into one equivalent motor according to the parallel and series connection principles of electric circuits. The equivalent per unit values can then be obtained.

Third, the switching frequency should be selected. Generally speaking a higher switching frequency implies a higher sampling frequency which results in a better damping effect since a physical resistor can be better approximated. This is subject to the constraint that the switching frequency is usually limited by the power rating of the drive. As a general guideline, it is recommended that the switching frequency be at least 500 Hz.

Fourth, a suitable value for the output capacitor shouldbe selected. In order to suppress the high frequency resonance, it is generally recommended that the sampling frequency of the digital controller be at least five times as high as the resonance frequency. With a high efficiency space vector switching pattern such as described in Trzynadlowski, Andrzej M., "*Introduction to Modern Power Electronics*", John Wiley & Sons, New York, N.Y, 1998, pp 296–301, 322–326, the sampling frequency is three times as high as the switching frequency. For example, if the switching frequency is 500 Hz, the sampling frequency will be 1500 Hz. In this case, the output filter capacitor may be selected to make the resonance frequency lower than 300 Hz. For large motor drives, the per unit values of the leakage inductance are typically around 0.15–0.2, which means that a 0.3 per unit output filter capacitor is typically large enough to satisfy this recommendation.

Figure 7:
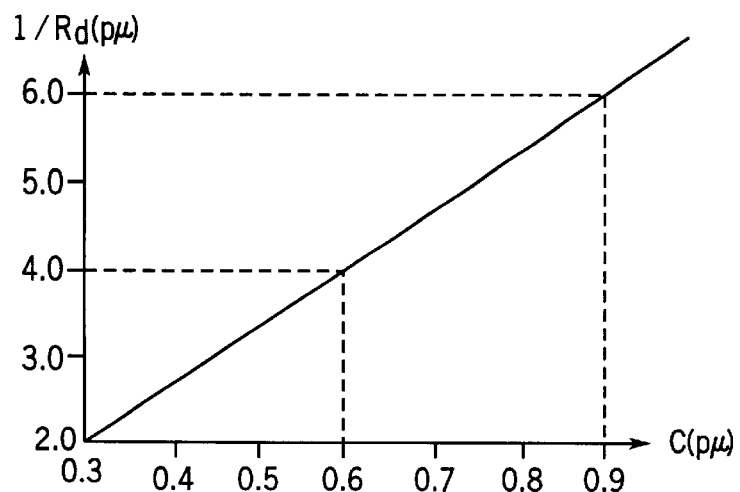
FIG. 7 is a graph showing the relationship between the per unit values of an output filter capacitor and a damping factor at a particular frequency.

Finally, the value of $R_d$ may be selected. In order to achieve an adequate damping effect, it is generally recommended that $R_d$ should be equal to or less than 0.5 per unit. According to the base value of impedance $Z_b$, the real value of $R_d$ can be obtained. FIG. 7 shows the relationship between the per unit value of the capacitor and the damping factor $R_d$ when the switching frequency is 500 Hz.

In the illustrated embodiment, the rectifier 24 is a PWM rectifier which requires the input filter capacitors $C_i$. A high frequency resonance mode also exists between the input filter capacitor $C_i$ and a system inductance $L_s$ associated with the power supply 22, as seen best in FIG. 2. If this resonance frequency is close to a characteristic harmonic of the rectifier (e.g., 5th or 7th), an oscillation will occur, which makes the stability of the PWM rectifier sensitive to the system impedance. Unfortunately it is difficult to measure the system impedance accurately, which complicates the design of a compensating filter. In addition, even when the resonance frequency is not close to any characteristic harmonic of the rectifier, undesired oscillations will also occur during tranient states.

Figure 5:
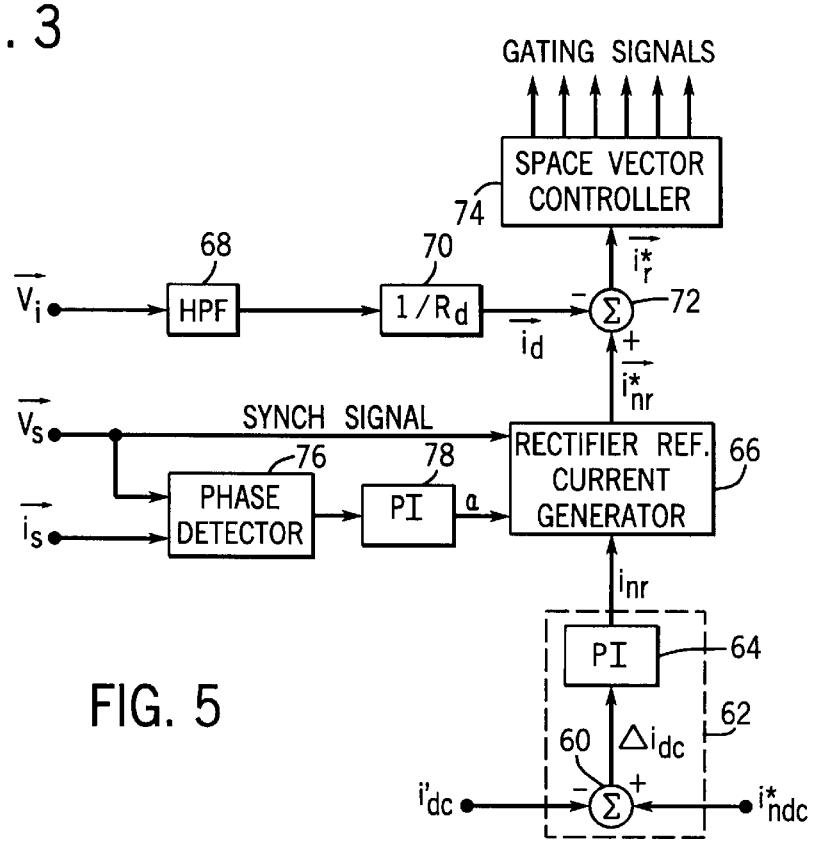
FIG. 5 is a system block diagram of a rectifier controller.

Active damping control may also be used to suppress the resonance mode of the PWM rectifier 24. FIG. 5 shows the PWM rectifier controller 26 in greater detail. The controller 26 features two control loops, one for control of the d.c. link current $i_{dc}$, and one for control of the power factor. With respect to the d.c. link control loop, the inverter controller 32 provides the rectifier controller 26 with a desired or command d.c. link current magnitude $i^*_{ndc}$, which generally corresponds to the magnitude of the inverter reference current $\vec{i}^*_o$. A compensator 62 comprising a summer 60 and a p.i. controller 64 receive $i^*_{ndc}$ and the feedback current $i'_{dc}$. The output of the compensator 64 is a nominal rectifier input current $\vec{i}_o$ which is fed into a rectifier reference current generator 66. The generator 66 produces a 120° three phase nominal reference current $\vec{i}_{nr}$ having magnitude $i_{nr}$, at the line frequency. The PWM rectifier controller 26 also includes active damping control in order to suppress the high frequency resonance between the input filter capacitor $C_i$ and the system inductance $L_s$ of the power supply. In this case, a high pass filter 68 allows the higher frequency harmonics of the rectifier input voltage. $\vec{v}_i$ to pass through a $1/R_d$ damping block 70. Block 70 produces a three phase damping current $\vec{i}_d$ which is deducted by a summer 72 from the nominal rectifier reference current $\vec{i}_d$ to produce a rectifier reference current $\vec{i}^*_r$. A second switching pattern generator such as space vector controller 74 generates the gating signal for the power switches $W_1$–$W_6$ of the PWM rectifier.

The power factor control loop attempts to provide a unity power factor relative to the line source, i.e., it is desired that $\vec{i}_s$ be in phase with $\vec{v}_s$, (see FIG. 1). The current $\vec{i}_{ci}$ through the input filter capacitor $C_i$ will generally lead the voltage $\vec{v}_i$. This enables $\vec{i}_s$ to be in phase with $\vec{v}_s$. This may be accomplished by detecting the phase difference between $\vec{i}_s$ and $\vec{v}_s$ at block 76. If the output of the phase detector 76 is not zero, this represents an error which is compensated for by a p.i. controller 78 whose output is a phase angle α. The rectifier reference current generator 66 establishes $\vec{i}^*_{nr}$ with a phase angle relative to $\vec{v}_s$ equal to α.

The illustrated embodiments have shown rectifier 24 as a PWM rectifier. However, those skilled in the art will appreciate that the drive 20 can be implemented using other types of rectifiers, such as a thyristor rectifier, with or without a d.c. chopper such as a multilevel buck chopper. The PWM rectifier is preferred, however, because it has a better dynamic performance tand the thyristor rectifier, and is more suitable in terms of power loss in medium voltage applications than d.c. choppers.

Similarly, while the switching pattern generator for the rectifier or inverter has been shown as a space vector controller, those skilled in the art will understand that the I5 invention is not limited to such a commutation technique. Rather, the limiting factor is whether the switching pattern generator can reasonably be considered as a linear amplifier, not taking into account switching harmonics.

2. Feedforward Control of Inverter Input Voltage

Figure 8:
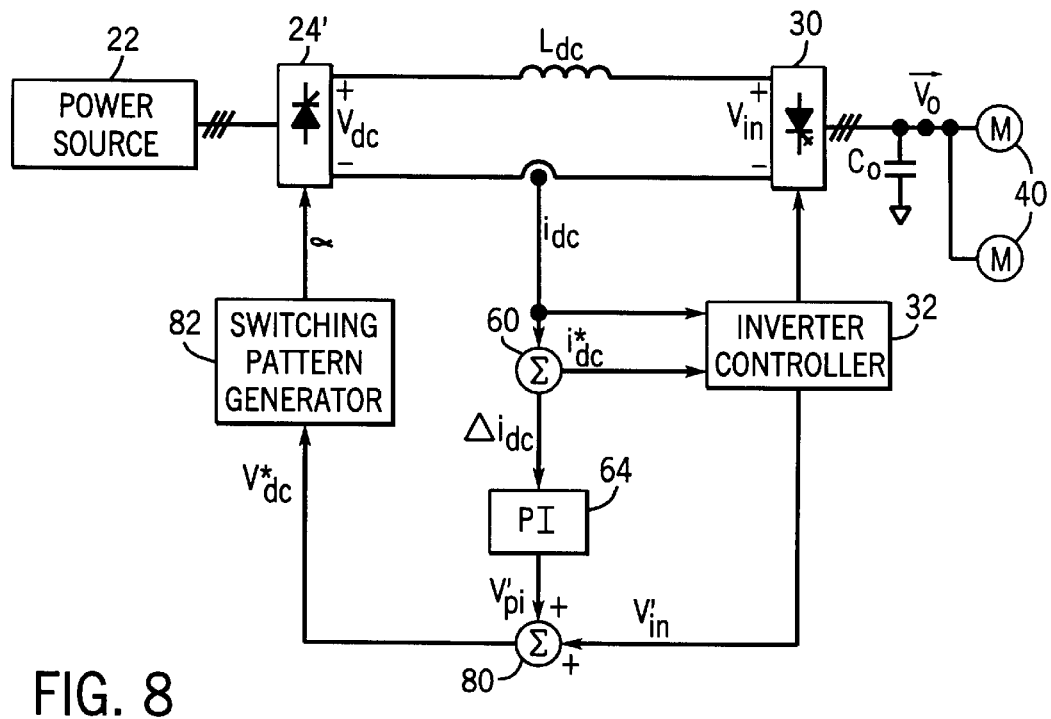
FIG. 8 is a system block diagram of a CSI based drive which employs a thyristor rectifier.

FIG. 8 shows another version of a CSI based a.c. induction motor drive. In the illustrated embodiment, a phase controlled thyristor rectifier 24' as known in the art per se is employed. In the d.c. link control loop (the power factor control loop is not shown) the output of p.i. controller 64 is a voltage which is fed into a switching pattern generator 82 that provides the gating signals to the thyristors of the rectifier 24'. The illustrated embodiment may or may not employ active damping control for the current source inverter, although it is preferred for the reasons described above.

Referring to FIG. 8, the relationship between the d.c. link current $i_{dc}$, rectifier output voltage $v_{dc}$ and inverter input voltage $v_{in}$ can be expressed by $$v_{dc} = v_{in} + L_{dc} \frac{di_{dc}}{dt} \qquad [3]$$

When the drive operates in a steady state condition with a constant d.c. link current, the average value of the rectifier output voltage $v_{dc}$ will be equal to that of the inverter input voltage $v_{in}$. However, under transient conditions, the rectifier output voltage $v_{dc}$ will have two components, namely a voltage drop on the d.c. link choke $L_{dc}$ and the inverter input voltage $v_{in}$. The voltage drop on the d.c. link choke is caused by the fact that in transient conditions, the current flow through the d.c. link choke cannot abruptly change. This causes a problem in the dynamic performance of the rectifier since the output voltage $v_{dc}$ cannot closely follow the changes of the inverter input voltage, yielding a sluggish response.

To improve the dynamic response of the d.c. link current, the illustrated embodiment employs a rectifier input voltage feedforward control loop. In this loop, the inverter controller 32 calculates the inverter side d.c. voltage $v_{in}$ based on the inverter output voltage $v_o$ and the currently active switches. For example, referring to FIG. 2, assume that in a given sampling period $T_s$ switches $S_1$ and $S_2$ are on for a duration $t_i$ and switches $S_1$ and $S_6$ are on for a duration $t_j$. In this case the average value of the inverter side d.c. voltage is calculated by $$v_{in}(avg) = \frac{(v_{o,a} - v_{o,b}) * t_i + (v_{o,a} - v_{o,c}) * t_j}{T_s} \qquad [4]$$

Similar equations can be derived based on the particular switching pattern employed, and the calculations are preferably carried out by the space vector controller 56 (shown in FIG. 3) since it computes the switching pattern. In the alternative, the inverter side d.c. voltage $v_{in}$ can be measured through the use of an additional sensor to thereby provide a different means for determining the inverter side d.c. voltage.

The calculated or measured voltage, $v_n{'}$, can be used as a part of the d.c. voltage reference, $v^*_{dc}$, employed by switching pattern generator 82, that is, $$v^*_{dc} = v_{in}{'} + v_{pi} \qquad [5]$$

where $v_{pi}$ is the output of the d.c. link current p.i. controller 64. As a result, the changes in the inverter output voltage due to the load changes can be directly compensated through the adjustment of the d.c. voltage reference. To effect this, a summer 80 adds the output of the p.i. controller 64 with $v_{in}{'}$, and the output of the summer is fed to the switching pattern generator 80.

The $v_{in}$ feedforward control has an added feature. In comparing equation [5] to equation [4], note that the output of the p.i. controller represents the voltage drop on the d.c. link choke. This implies that the design of the d.c. link current p.i. controller is mainly associated with $L_{dc}$, independent of other system parameters. In the absence of the tS feedforward control, the parameters of the p.i. controller may be difficult to determine since the inverter side d.c. voltage $v_{in}$ will depend on the load. This is undesireable, particulalry for multi-motor applications.

Figure 9:
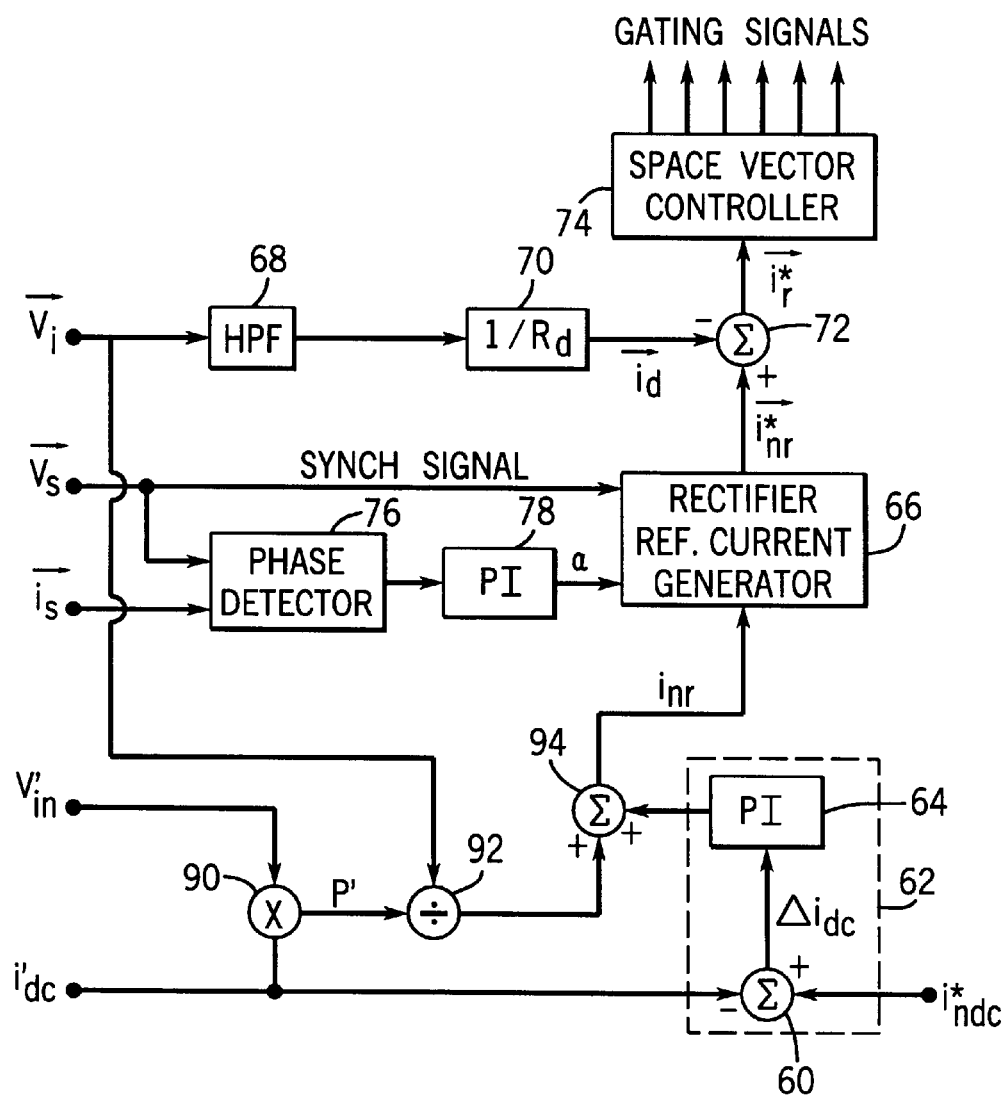
FIG. 9 is a system block diagram of a PWM rectifier controller.

The $v_{in}$ feedforward control may also be applied in circumstances where the drive employs a PWM rectifier which employs a switching pattern generator based on a current reference signal. In this case, referring to the drive shown in FIG. 1 and additionally to a more detailed view of the rectifier controller shown in FIG. 9, the measured or calculated value $v_{in}{'}$ can be multiplied by a multiplier 90 with the measured d.c. link current $i_{dc}$ to determine the active power P' flowing through the inverter. Since the d.c. link choke $L_{dc}$ will ideally not consume any active power, the active power flowing through the rectifier 24' should be the same. Therefore the transient component of the rectifier current $i_r$ (on a per phase basis) arising as a result of the inverter side d.c. voltage $v_{in}$ can be computed by $P'/\vec{v}_i$, as provided by a divider 92. The multiplier and divider may be thought of as forming part of the means for determining the inverter side d.c. voltage, but which provides a current based output signal rather than a voltage based output signal. A summer 94 adds the output of the p.i. controller 64 with the current-based output signal of the divider 92 to determine the nominal rectifier reference current $i_{nr}$.

Those skilled in this art will understand that numerous variations may be made to the embodiments described herein without departing from the spirit or scope of the invention.

We claim:

1. A motor drive, comprising:
   a rectifier for converting alternating current into direct current;
   a current source inverter for converting direct current into alternating current;
   a d.c. link choke interconnecting the rectifier and the inverter;
   an inverter controller for controlling the inverter, said controller generating a desired d.c. link choke current;
   means for determining a d.c. input voltage of the inverter or current required thereby and generating a voltage or current based output signal;
   means for determining the actual d.c. link current;
   a rectifier controller, including a compensator receiving as inputs the desired and actual d.c. link currents, a summer for adding the output of the compensator and the output signal of the means for determining the d.c. input voltage of the inverter or current required thereby, and a switching pattern generator, receiving the output of the summer, for controlling switches in the rectifier.

2. The drive according to claim 1, wherein said means for determining the d.c. input voltage of the inverter or current required thereby includes one of a sensor and means for calculating the d.c. input voltage of the inverter based on the output voltage of the inverter.

3. The drive according to claim 2, wherein the output signal of the means for determining the d.c. input voltage of the inverter or current required thereby is the d.c. input voltage of the inverter, and the output of the summer is a voltage signal.

4. The drive according to claim 2, wherein the output signal of the means for determining the d.c. input voltage of the inverter or current required thereby is a current signal and the output of the summer is a current signal.

5. The drive according to claim 4, wherein the means for determining a d.c. input voltage of the inverter or current required thereby includes a multiplier for multiplying the d.c. input voltage of the inverter by the actual d.c. link current and a divider for dividing the output of the multiplier by an input voltage of the rectifier.

6. A method for operating a motor drive comprising a current source inverter connected to a rectifier via a d.c. link choke, wherein a controller associated with the inverter generates a desired d.c. link current, said method including:
   determining the actual d.c. link current;
   determining a d.c. input voltage of the inverter or current required by the inverter;
   generating a signal from a minimizing compensator which receives as inputs the desired and actual d.c. link currents;
   adding the value of the inverter input voltage or current required by the inverter to the compensator signal to produce a reference signal; and
   establishing a switching pattern for switches of the rectifier based on the reference signal.

7. The method according to claim 6, wherein the step of determining the inverter d.c. input voltage or current required by the inverter includes one of measuring the inverter d.c. input voltage with a sensor and calculating the inverter d.c. input voltage based on the output voltage of the inverter.

8. The method according to claim 6, wherein in step 6(*b*) the inverter d.c. input voltage is determined, the signal produced from the compensator is a voltage signal, and the reference signal is a voltage signal.

9. The method according to claim 6, wherein in step 6(*b*) the current required by the inverter is determined, the signal produced from the compensator is a current signal, and the reference signal is a current signal.

10. The method according to claim 9, wherein the step of determining the current required by the inverter includes multiplying the inverter input voltage by the actual d.c. link current and dividing the result by an input voltage of the rectifier, the result being added to the compensator signal so as to determine the reference signal.

* * * * *